US008566724B2

(12) United States Patent
Nair et al.

(10) Patent No.: US 8,566,724 B2
(45) Date of Patent: Oct. 22, 2013

(54) ONLINE CUSTOMIZATION OF INFORMATION USING A SITE MANAGEMENT MODULE

(75) Inventors: Suresh G. Nair, Robbinsvile, NJ (US);
Paulo Resende, Jr., Ewing, NJ (US);
Devi S. Kumar, West Windsor, NJ (US)

(73) Assignee: Bank of America Corporation, Charlotte, NC (US)

( * ) Notice: Subject to any disclaimer, the term of this patent is extended or adjusted under 35 U.S.C. 154(b) by 337 days.

(21) Appl. No.: 12/760,073

(22) Filed: Apr. 14, 2010

(65) Prior Publication Data

US 2011/0258168 A1 Oct. 20, 2011

(51) Int. Cl.
*G06F 3/00* (2006.01)
*G06F 7/00* (2006.01)

(52) U.S. Cl.
USPC ............ 715/733; 715/760; 707/736; 707/756

(58) Field of Classification Search
None
See application file for complete search history.

(56) References Cited

U.S. PATENT DOCUMENTS

| | | | |
|---|---|---|---|
| 6,046,739 A | 4/2000 | MacPhail | |
| 7,174,339 B1 * | 2/2007 | Wucherer et al. ................... | 1/1 |
| 7,685,598 B1 | 3/2010 | Badenell et al. | |
| 2002/0070978 A1 | 6/2002 | Wishoff et al. | |
| 2002/0082850 A1 | 6/2002 | Panelli | |
| 2003/0004744 A1 | 1/2003 | Greene et al. | |
| 2003/0197733 A1 | 10/2003 | Beauchamp et al. | |
| 2004/0254881 A1 | 12/2004 | Kumar et al. | |
| 2006/0031849 A1 | 2/2006 | Barta et al. | |
| 2006/0036969 A1 | 2/2006 | Guido et al. | |
| 2006/0080120 A1 | 4/2006 | Tcherevik | |
| 2007/0079282 A1 | 4/2007 | Nachnani et al. | |
| 2007/0209011 A1 * | 9/2007 | Padmanabhuni et al. ...... | 715/762 |
| 2008/0052102 A1 | 2/2008 | Taneja et al. | |
| 2008/0228714 A1 | 9/2008 | Prager et al. | |
| 2008/0263009 A1 | 10/2008 | Buettner et al. | |
| 2009/0276318 A1 | 11/2009 | Broadbent et al. | |
| 2010/0071026 A1 | 3/2010 | Poulsen et al. | |
| 2010/0218084 A1 | 8/2010 | Sivadas et al. | |
| 2010/0312542 A1 | 12/2010 | Van Wyk et al. | |

OTHER PUBLICATIONS

U.S. Appl. No. 12/760,169, "Interfacing Between Applications Utilizing a Desktop Module," inventor Nair et al., 34 pages plus 8 pages of drawings, Apr. 14, 2010.

U.S. Appl. No. 12/760,236, "Customization of Information Using a Desktop Module," inventor Nair et al., 34 pages plus 8 pages of drawings, Apr. 14, 2010.

U.S. Patent and Trademark Official Action in U.S. Appl. No. 12/760,236, dated Dec. 8, 2011, 10 pages, Dec. 8, 2011.

(Continued)

*Primary Examiner* — Sangwoo Ahn
(74) *Attorney, Agent, or Firm* — Michael A. Springs

(57) ABSTRACT

To customize information online using a site management module, a request is received, from a remote computer over a network, to modify information for presentation in a container on a computer, wherein the container facilitates interaction between a plurality of applications associated with a plurality of business units. Configuration information is received from the remote computer to modify the presentation of information. A processor generates a modifiable configuration file according to the configuration information, wherein the modifiable configuration file comprises instructions to present the information in the container on the computer.

20 Claims, 8 Drawing Sheets

(56) References Cited

OTHER PUBLICATIONS

PCT Notification of Transmittal of the International Search Report and the Written Opinion of the International Searching Authority, or the Declaration with attached International Search Report and the Written Opinion of the International Searching Authority in International Application No. PCT/US 11/27810, dated May 4, 2011, 9 pages.

PCT Notification of Transmittal of the International Search Report and the Written Opinion of the International Searching Authority, or the Declaration with attached International Search Report and the Written Opinion of the International Searching Authority in International Application No. PCT/US 11/27812, dated May 5, 2011, 7 pages.

PCT Notification of Transmittal of the International Search Report and the Written Opinion of the International Searching Authority, or the Declaration with attached International Search Report and the Written Opinion of the International Searching Authority in International Application Serial No. PCT/US 11/27816, dated May 5, 2011, 6 pages.

U.S. Patent and Trademark Office Final Official Action in U.S. Appl. No. 12/760,236 dated May 10, 2012, 7 pages.

U.S. Patent and Trademark Office Final Official Action in U.S. Appl. No. 12/760,169, dated Jun. 18, 2012, 21 pages.

Nair et al., U.S. Appl. No. 12/760,169, Final Office Action from the U.S. Patent and Trademark Office dated Oct. 16, 2012, 19 pages.

Nair et al., U.S. Appl. No. 12/760,169, Advisory Action from U.S. Patent and Trademark Office dated Jan. 4, 2013, 3 pages.

Nair et al., U.S. Appl. No. 12/760,236, Non-Final Office Action from U.S. Patent and Trademark Office dated Mar. 28, 2013, 9 pages.

\* cited by examiner

```xml
<MenuItem xsi:type="MenuNode">
    <Id>1</Id>
    <Name>WealthManagement</Name>
    <Caption>Wealth Management</Caption>
    <Styles>
        <Property>
            <Name>imageSmall</Name>
            <Value>wealth.gif</Value>
        </Property>
        <Property>
            <Name>imageLarge</Name>
            <Value>wealth_b.gif</Value>
        </Property>
    </Styles>
    <SubMenus>
        <MenuItem xsi:type="MenuLeafNode">
            <Id>201</Id>
            <Name>Portoflio Inquiries</Name>
            <Caption>Portoflio Inquiries</Caption>
            <ActionItem>
                <AppID>PortfolioInquiries</AppID>
            </ActionItem>
        </MenuItem>
        <MenuItem xsi:type="MenuLeafNode">
            <Id>202</Id>
            <Name>MultiCurrencyPerformance</Name>
            <Caption>Multi-Currency Performance</Caption>
            <ActionItem>
                <AppID>MPRApp</AppID>
            </ActionItem>
        </MenuItem>
    </SubMenus>
</MenuItem>
```

*FIG. 6*

ONLINE CUSTOMIZATION OF INFORMATION USING A SITE MANAGEMENT MODULE

TECHNICAL FIELD OF THE INVENTION

This invention relates generally to configuring information for presentation and, more specifically, to online customization of information using a site management module.

BACKGROUND

Enterprises use various business applications to perform operations within the enterprise. Within the enterprise, the business applications may utilize application-specific protocols. The business applications interact with other business applications that use the same protocol. Therefore, business applications that use different protocols are not able to interact.

SUMMARY OF THE DISCLOSURE

In accordance with the present invention, disadvantages and problems associated with customizing information associated with various business units may be reduced or eliminated.

According to one embodiment of the present invention, to customize information online using a site management module, a request is received, from a remote computer over a network, to modify information for presentation in a container on a computer, wherein the container facilitates interaction between a plurality of applications associated with a plurality of business units. Configuration information is received from the remote computer to modify the presentation of information. A processor generates a modifiable configuration file according to the configuration information, wherein the modifiable configuration file comprises instructions to present the information in the container on the computer.

Certain embodiments of the invention may provide one or more technical advantages. A technical advantage of one embodiment includes providing a common interface between applications and the platform. By providing this common interface, standard patterns of application development may be provided, which reduces costs and improves efficiency. The common interface also provides an intuitive way to manage application windows and application content for multiple types of business applications. Accordingly, a user may navigate and control a number of applications simultaneously. Another technical advantage of an embodiment includes improving technology integration across various business applications and enabling the consolidation and convergence of various platforms. As mentioned above, this consolidation improves development operations by reducing costs and increasing efficiency. Yet another technical advantage of an embodiment includes supporting communication between applications. Applications share information on the desktop rather than involving a server, which improves performance and decreases the load on the server and the network. Another technical advantage of an embodiment comprises providing a single, consolidated deployment infrastructure for various platforms. Applications to be deployed may be customized before deployment or after deployment. The customization may be reflected on a plurality of computers that use the customized application. A user may also perform the customize remotely through the use of an online tool.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which:

FIG. 6 illustrates an example execution file to facilitate customization using the desktop module;

DETAILED DESCRIPTION OF THE DRAWINGS

Embodiments of the present invention and its advantages are best understood by referring to FIGS. 1 through 9, like numerals being used for like and corresponding parts of the various drawings.

Enterprises typically include different business units, divisions, or lines of business, that handle different aspects of the enterprise. Each unit may use specific applications to handle the information associated with the unit. Even though each unit is different, similar information may be used between the different units. Typically, the units are not able to share information between the different applications and the applications do not work in a coordinated manner, which increases operating costs and reduces efficiency. The teachings of the disclosure recognize that it would be desirable to provide a platform that consolidates different applications based on functionality to improve technology integration between the business units without having to repeat functionality across applications. This platform provides information across various applications, which reduces costs and improves efficiency because a user does not have to identify the common information in each application and repeat the same information across the applications.

Figure 1:
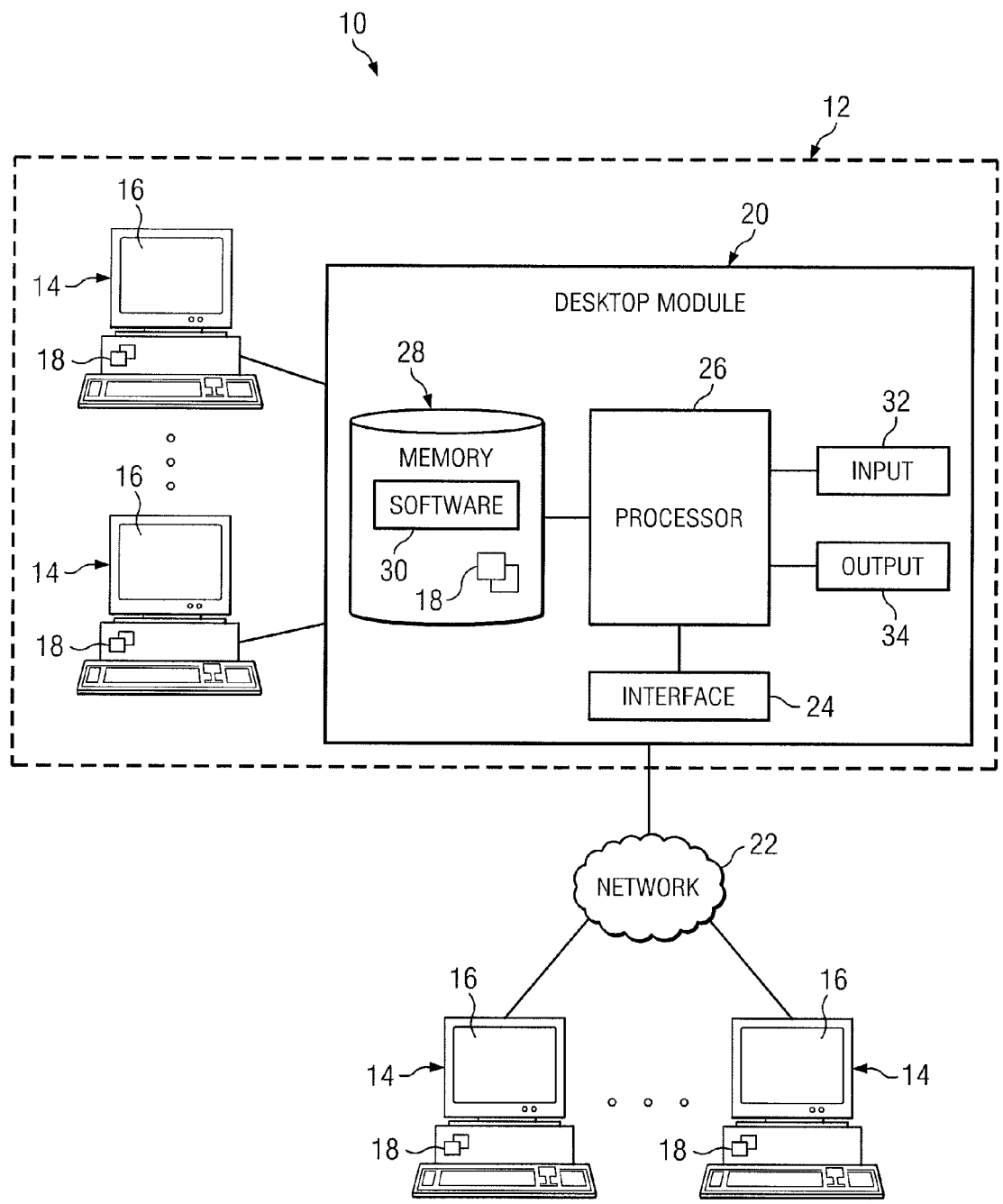
FIG. 1 illustrates a system that facilitates interfacing between various applications utilizing a desktop module.

FIG. 1 illustrates a system 10 that facilitates interfacing between various applications 18 utilizing a desktop module 20. System 10 may include an enterprise 12, one or more computers 14, and a desktop module 20. Enterprise 12, computers 14, and desktop module 20 may be communicatively coupled by a network 22. Computers 14 interact with desktop module 20 to facilitate the use of various applications 18.

System 10 includes an enterprise 12, which may refer to a financial institution, such as a bank, and may include computers 14 and desktop module 20. Even though enterprise 12 is referred to as a financial institution, enterprise 12 represents any suitable type of entity in any suitable industry. Enterprise 12 may have different business units that handle different business activities. For example, a retirement group, a call center, a wealth management group, and a global financial group represent different business units associated with enterprise 12. Computers 14 within enterprise 12, and the users of those computers 14, may each be associated with different business units. Because of the association with various business units, computers 14 may use different applications 18 to facilitate work in the line of business. Desktop module 20 facilitates the integration of applications 18 between the different business units.

Computers 14 communicate with desktop module 20 to manage applications 18. As illustrated, computer 14 may be within enterprise 12 or outside of enterprise 12. Computer 14 may include a personal computer, a workstation, a laptop, a wireless or cellular telephone, an electronic notebook, a personal digital assistant, or any other device (wireless, wireline, or otherwise) capable of receiving, processing, storing, and/or communicating information with other components of system 10. A user of computer 14 may initiate application 18 and manage application 18 based on the user's preferences. Computer 14 may also comprise a user interface, such as a display, a microphone, keypad, or other appropriate terminal equipment usable by a user.

In the illustrated embodiment, computer 14 includes a graphical user interface ("GUI") 16 that displays information associated with applications 18 and information received from desktop module 20. GUI 16 is generally operable to tailor and filter data entered by and presented to the user. GUI 16 may provide the user with an efficient and user-friendly presentation of information using a plurality of displays having interactive fields, pull-down lists, and buttons operated by the user. GUI 16 may include multiple levels of abstraction including groupings and boundaries. It should be understood that the term GUI 16 may be used in the singular or in the plural to describe one or more GUIs 16 in each of the displays of a particular GUI 16.

Computer 14 also includes one or more applications 18. Application 18 represents any suitable software or logic that allows a user to analyze and/or process information for a customer or client. For example, application 18 may include a web application, a generic application, a routine application, a third-party application, a high-on-demand application, an application associated with a business unit, or any other future application types. According to an embodiment, applications 18 associated with different business units may be integrated using desktop module 20.

Desktop module 20 represents any suitable component that facilitates the use of applications 18 associated with different business units by computers 14. Desktop module 20 enables high-performing, highly-scalable, technology independent application development and deployment. To facilitate this process, desktop module 20 delivers configurable desktop containers, which will be discussed in greater detail in FIG. 2, that integrate various applications 18. Desktop module 20 may include a network server, any suitable remote server, a mainframe, a host computer, a workstation, a web server, a personal computer, a file server, or any other suitable device operable to communicate with computers 14 and process data. In some embodiments, desktop module 20 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of desktop module 20 may be performed by any suitable combination of one or more servers or other components at one or more locations. In the embodiment where the module is a server, the server may be a private server, and the server may be a virtual or physical server. For example, desktop module 20 may be local to enterprise 12 or remote to enterprise 12. Also, desktop module 20 may include any suitable component that functions as a server. In the illustrated embodiment, desktop module 20 includes an interface 24, a processor 26, a memory 28, an input 32 and an output 34.

Interface 24 represents any suitable device operable to receive information from network 22 and/or computers 14, transmit information through network 22, perform processing of information, communicate to other devices, or any combination of the preceding. For example, interface 24 communicates event information associated with applications 18 to computers 14. Interface 24 represents any port or connection, real or virtual, including any suitable hardware and/or software, including protocol conversion and data processing capabilities, to communicate through network 22 that allows desktop module 20 to exchange information with computers 14, or other components of system 10.

Processor 26 communicatively couples to interface 24, memory 28, input 32 and output 34, and controls the operation and administration of desktop module 20 by processing information received from interface 24, memory 28, input 32, and output 34. Processor 26 includes any hardware and/or software that operates to control and process information. For example, processor 26 executes software 30 to service computers 14 and manage applications 18. Processor 26 may be a programmable logic device, a microcontroller, a microprocessor, any suitable processing device, or any suitable combination of the preceding.

Memory 28 stores, either permanently or temporarily, data, operational software, or other information for processor 26. Memory 28 includes any one or a combination of volatile or non-volatile local or remote devices suitable for storing information. For example, memory 28 may include random access memory (RAM), read only memory (ROM), magnetic storage devices, optical storage devices, or any other suitable information storage device or a combination of these devices. While illustrated as including particular modules, memory 28 may include any suitable information for use in the operation of desktop module 20.

In the illustrated embodiment, memory 28 includes software 30 that facilitates the provision of service to computers 14 and the management of applications 18. Software 30 represents any suitable set of instructions, logic, or code embodied in a computer-readable storage medium. Memory 28 may also include applications 18 for use by computer 14.

Network 22 represents any suitable network operable to facilitate communication between the components of system 10 such as enterprise 12, computers 14, and desktop module 20. Network 22 may include any interconnecting system capable of transmitting audio, video, signals, data, messages, or any combination of the preceding. Network 22 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

In an exemplary embodiment of operation, desktop module 20 receives a request to launch application 18. As discussed with respect to FIG. 2, application 18 may be opened in a container, which facilitates the use of applications 18 associated with different business units in a single framework. A user may configure the layout of applications 18 within the container according to a user's preference or according to the preference of the user's business unit. When opened within the container, application 18 may also subscribe to various events and receive notifications of changes that occur with the event. This allows applications 18 across multiple business units to receive updated information based on the subscription without users having to manually update information associated with events.

Modifications, additions, or omissions may be made to system 10 without departing from the scope of the invention. For example, computers 14 may internally include the functionality of desktop module 20 and not have to interact with a separate component. Additionally, system 10 may include any number of computers 14, desktop modules 20, and networks 22. Any suitable logic may perform the functions of system 10 and the functions of components within system 10.

Any suitable component of system 10 may include an interface, logic, memory, and/or other suitable element. An interface receives input, sends output, processes the input and/or output and/or performs other suitable operations. An interface may comprise hardware and/or software. Logic performs the operation of the component, for example, logic executes instructions to generate output from input. Logic may include hardware, software, and/or other logic. Logic may be encoded in one or more non-transitory, tangible media, such as a computer-readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Figure 2:
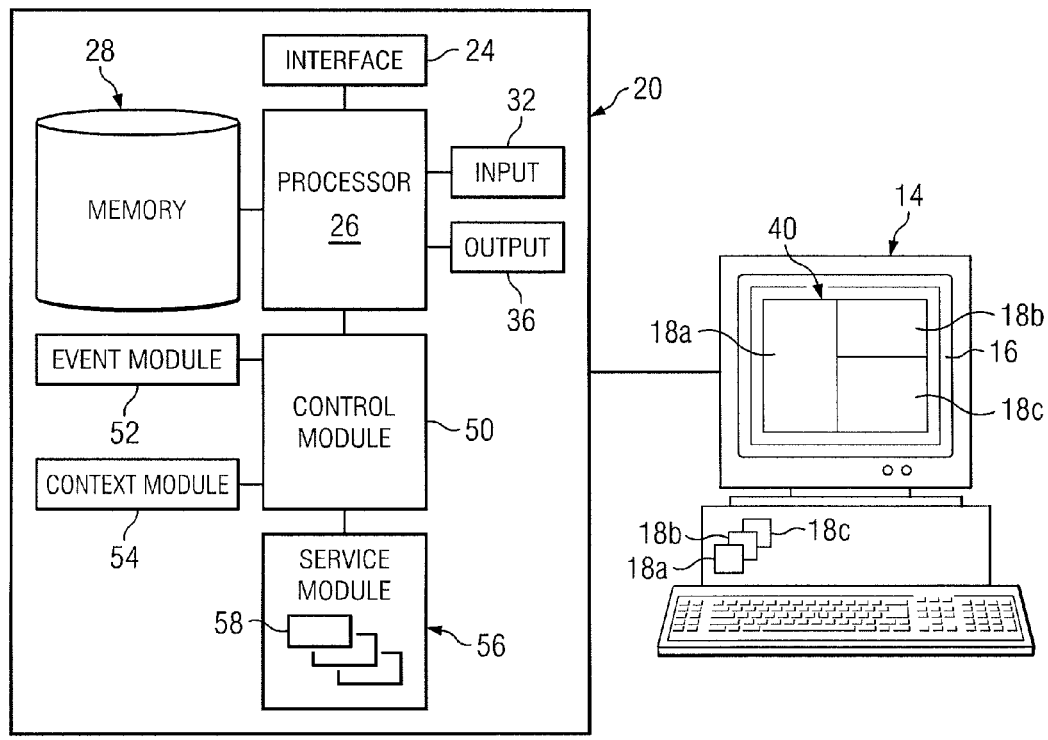
FIG. 2 illustrates a particular embodiment of a desktop module to interface between the various applications.

FIG. 2 illustrates a particular embodiment of desktop module 20 that facilitates interfacing between various applications 18. In the illustrated embodiment, applications 18a-18c are running on computer 14 and are displayed within container 40.

Container 40 represents a management component that provides unified access to and display of applications 18 related to various business units within enterprise 12. A user may configure container 40 to display applications 18 in any suitable layout as determined by the user. Container 40 supports web applications, generic applications, routine applications, third-party applications, high-on-demand applications, applications associated with each business unit, or any other future application types. Container 40 also supports communication between applications 18. For example, container 40 enables data and event sharing between applications 18.

Computer 14 may launch any suitable number of containers 40. In an embodiment, computer 14 may launch two separate instances of container 40 that do not interact. In another embodiment, computer 14 may launch multiple instances of container 40 and the instances may interact and share information. Any configurable number of applications 18 may be launched inside container 40. For example, container 40 may launch six different applications 18, concurrently, which use different protocols, languages, or formats.

The various applications 18 associated with container 40 may run within container 40 or may run outside of container 40. For example, applications 18 running within container 40 are visible on container 40. While applications 18 running outside of container 40 are not visible on container 40 and are detached, these applications 18 may continue to interact with desktop module 20. To manage and service applications 18 associated with container 40, computer 14 interacts with desktop module 20.

As discussed above, computer 14 may interact directly with desktop module 20 or may interact with desktop module 20 over network 22. Desktop module 20 facilitates the interaction of a plurality of applications 18 associated with various users and business units in enterprise 12. In an embodiment, desktop module 20 facilitates a user customizing container 40 and applications 18 within container 40. In another embodiment, desktop module 20 facilitates remote customization of container 40 and applications 18 within container 40 using an online management tool. In yet another embodiment, desktop module 20 allows users of applications 18 to subscribe to events and to receive the context of events as updates occur. In addition to the components described in FIG. 1, desktop module 20 may include a control module 50, an event module 52, a context module 54, and a service module 56 to facilitate interaction with computer 14.

Control module 50 interacts with applications 18 to provide services from data module 20 and to facilitate the interaction of event module 52, context module 54, and service module 56 with applications 18. In some embodiments, applications 18 may not use control module 50 to access the services provided by desktop module 20. For example, a high-on-demand application may not use control module 50. In an exemplary embodiment, control module 50 may be implemented as an ACTIVEX® control. Control module 50 may be run within container 40 or outside container 40.

Control module 50 may include various interfaces to facilitate the interaction between applications 18 and the other components within desktop module 20, but interacts directly with service module 56. For example, control module 50 includes a messaging interface that allows applications 18 to subscribe to various events and/or contexts and allows event module 52 and context module 54 to publish information associated with the events and contexts. As another example, control module 50 may include a context interface, which represents memory that stores context information. The context interface may store the information for desktop module 20 to quickly access when publishing information to applications 18. Control module 50 may also include interfaces for applications 18 integrated within desktop module 20 and interfaces for applications 18 running in a process separate from desktop module 20.

Applications 18 register with event module 52 and context module 54 to subscribe to events and to receive the context information associated with the events. This subscription capability allows each application 18 to be subscribed to the event and to receive updated context information without having to manually update each application 18 with the context information. Event module 52 and context module 54 facilitate the subscription and publication of events and the provision of context information associated with the events.

Event module 52 communicates events between applications 18 and desktop module 20. Additionally, event module 52 facilitates applications 18 subscribing to events and facilitates the publication of events by desktop module 20 and/or applications 18. The events may be published and/or subscribed to asynchronously and/or simultaneously. Event module 52 may communicate notifications to a currently active application 18 within container 40, and a detached application 18 running outside of container 40 may receive the notification once a user reactivates application 18. If a detached application 18 has multiple events to receive, event module 52 may deliver the multiple events in a single notification message. Active and detached applications 18 may publish events to event module 52. Events may include occurrences in market news, occurrences with market data, occurrences with a customer account, or any other suitable occurrence. When a subscribed event changes, application 18 receives the updated context information from event module 52.

Context module 54 manages context information across applications 18. Context module 54 represents hierarchical memory files to store context information. The context information may include information received from a mainframe, which facilitates localized and fast availability of data for event notification. The context information may include a client identifier, a client name, account information, address information, data regarding markets, currency information, language information, symbol information, a high net worth indicator, or other suitable information that application 18 may use.

Service module 56 represents a component that facilitates the provision of services to container 40, such as providing event notification and context information to applications 18. In the illustrated embodiment, service module 56 includes configuration files 58, which store information about the events to which applications 18 subscribes and store information about the context elements associated with the events. Configuration files 58 may also store the settings associated with the layout of containers 40 and applications 18. These configuration files 58 may include settings associated with a user's login credentials, a user's entitlements, or a particular business unit, which allows container 40 to start up in the layout configured by the user or the business unit. Storing the settings in configuration file 58 improves the start-up time of containers 40 and applications 18. Configuration files 58 may also store configuration information associated with desktop module 20. Configuration files 58 may include eXtensible Markup Language (XML) configuration files.

A component of desktop module 20 may include an interface, logic, memory, and/or other suitable element. An interface receives input, sends output, processes the input and/or output, and/or performs other suitable operation. An interface may comprise hardware and/or software. Logic performs the operation of the component, for example, logic executes instructions to generate output from input, Logic may include hardware, software, and/or other logic. Logic may be encoded in one or more tangible media, such as a computer readable medium or any other suitable tangible medium, and may perform operations when executed by a computer. Certain logic, such as a processor, may manage the operation of a component. Examples of a processor include one or more computers, one or more microprocessors, one or more applications, and/or other logic.

Modifications, additions, or omissions may be made to desktop module 20 without departing from the scope of the invention. For example, desktop module 20 may include one or more adapters that facilitate the translation of information between different protocols. In an embodiment, a CICERO® adapter may be used to facilitate communication between the components within desktop module 20, between desktop module 20 and container 40, or between desktop module 20 and applications 18. As another example, desktop module 20 may include a remote installer that creates an installation log, rather than having the configuration information stored on computer 14. As yet another example, the functions of control module 50, event module 52, context module 54, and/or service module 56 may be performed by any suitable combination of one or more servers or other components at one or more locations. In the embodiment where the modules are servers, the servers may be public or private servers, and each server may be a virtual or physical server. Also, modules 50, 52, 54, and 56 may include any suitable component that functions as a server.

Figure 3:
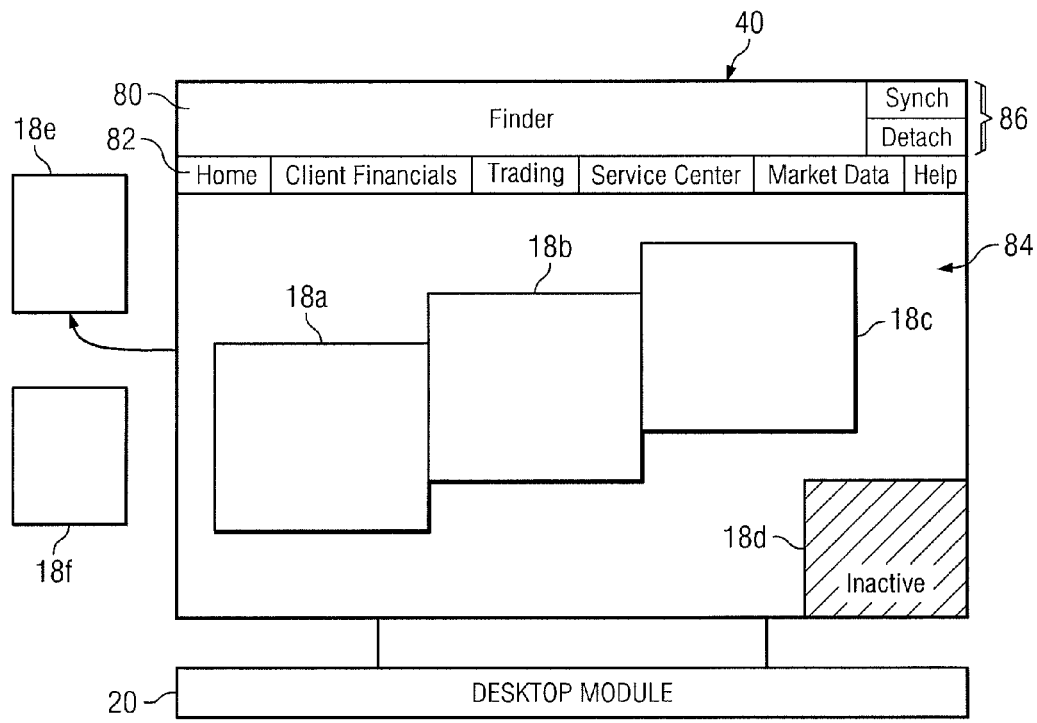
FIG. 3 illustrates an example embodiment of a container that provides an interface between the various applications.

FIG. 3 illustrates an example embodiment of container 40 that provides an interface between various applications 18. Container 40 may include applications 18, toolbar 80, navigation menu 82, workspace 84, and application menu 86.

As described above, applications 18 represent applications that may have different protocols, formats, or programming languages and are associated with different business units. In an embodiment, applications 18 may be launched outside of container 40 to interact with desktop module 20 and receive services, such as event notifications and context information. Applications 18 launched outside of container 40 are controlled by other mechanisms provided on computer 14. In another embodiment, applications 18 may be launched within container 40 to interact with desktop module 20 and receive the services. While container 40 may control applications 18 launched within it, different instances of applications 18 may exist. Applications 18 may be active and attached to container 40, as illustrated by applications 18*a*, 18*b*, and 18*c*; applications 18 may be inactive and attached to container 40, as illustrated by application 18*d*; applications 18 may be detached and floating outside container 40, as illustrated by application 18*e*; or applications 18 may operate in a distinct instance separate from container 40, as illustrated by application 18*f*.

When application 18*d* is inactivated, application 18 loses the previous viewable prominence within container 40, and may be grayed out or placed in the background of container 40. A user may activate an inactive application 18 by moving a pointer on or over the inactive application 18, clicking on the inactive application 18, or performing any other suitable action.

An active application 18 attached to container 40 is controlled by container 40. Likewise, an inactive application 18 attached to container 40 is controlled by container 40. Container 40 may also control a detached application 18 floating outside container 40. However, application 18 may run in a process separate from container 40, similar to an application 18 initially launched outside container 40.

Active and inactive applications 18 may interact with desktop module 20, but in different ways. For example, desktop module 20 communicates event notifications and context information to update an active application 18 upon the event occurring. Alternatively, desktop module 20 does not release event notifications and context information to an inactive application 18 until application 18 becomes active again. A detached application 18 floating outside container 40 may receive event notifications and context information upon synching up with container 40 and becoming active.

A user may configure applications 18 to be displayed within container 40 in any suitable manner. In an embodiment, a user may group applications 18 in workspace 84. Workspace 84 represents a preconfigured layout including one or more applications 18. For example, if applications 18*a*, 18*b*, and 18*c* are used together for a particular business unit, a user may define workspace 84 to include applications 18*a*, 18*b*, and 18*c*. When needed, the user may activate applications 18*a*, 18*b*, and 18*c* by selecting workspace 84. Any suitable number of workspaces 84 may be configured for various business units or users. For example, a financial advisor may use a standard workspace 84, a branch operations user or manager may use a operations workspace 84, a call center user may use a call center workspace 84, and a home office user may use a home office workspace 84. In an embodiment, each workspace 84 has associated entitlement settings that apply particular rules as to the information available to a user. These entitlement settings may be based on the business unit or a user's role within the business unit.

Toolbar 80 may include information associated with a particular business unit. For example, toolbar 80 may include applications 18 associated with the business unit, search bars to launch mainframe transactions, commands to facilitate working in application 18, shortcuts, or other suitable information to facilitate a user's work in container 40.

Navigation menu 82 represents a toolbar that allows a user to navigate to different information. In the illustrated embodiment, navigation menu 82 includes various options, such as "Home," "Client Financials," "Trading," "Service Center," "Market Data," and "Help." A user may select the desired information to receive from navigation menu 82. Navigation menu 82 may be configured according to the requirements of a business unit. In other embodiments, navigation menu 82 may also include, user preferences, research, shortcuts, workspace layout, market tools, business unit specific options, or other suitable options that facilitate a user's interaction with container 40.

Application menu 86 represents a toolbar or other suitable interface that allows a user to cause application 18 to detach from container 40 or synch up with container 40. The detached option may cause application 18 to become inactive and float outside container 40, while continuing to run on the same process. Detached application 18 would not be viewable on container 40, but would float outside container 40. Additionally, detached application 18 does not receive updates regarding events or context information until the detached application 18 is synched up with container 40 and again becomes active. The synch option causes application 18 to appear within container 40 and become activated within container 40. Application 18 synched with container 40 is viewable within container 40, and receives event notifications and updated context information. A user may highlight application 18 on which to perform the action, and then click or press either the synch button or the detach button on container 40 to perform the desired operation.

Modifications, additions, or omissions may be made to container 40. For example, container 40 may also include a sidebar that includes information particular to the business unit. This information may include particular applications 18 associated with the business unit, such as market tools, markets and investments, client information, and research information. As another example, application 18 may be configured to respond to events associated with container 40, changes in context information, or event notifications. Application 18 may respond to the information according to pre-configured rules.

Figure 4:
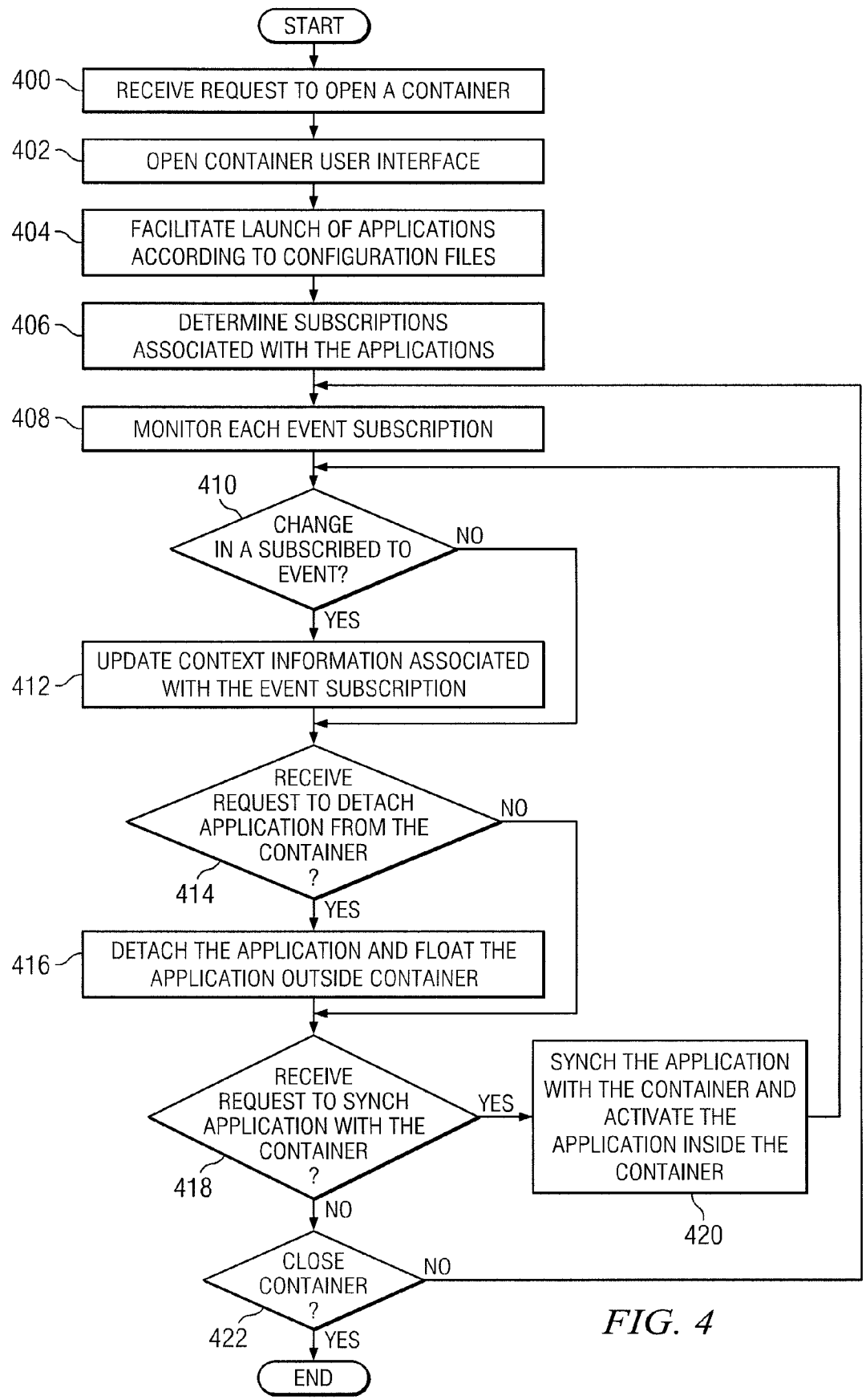
FIG. 4 illustrates a flowchart for interfacing between various applications.

FIG. 4 illustrates a flowchart for interfacing between various applications 18. The method begins at step 400 when desktop module 20 receives a request to open a container 40. A user may open container 40 through an icon on a GUI 16 of computer 14. When the option is selected, at step 402, a main window is opened that includes container 40. Desktop module 20 facilitates the launch of applications 18 within container 40 at step 404. Applications 18 may be launched according to configuration files 58, which cause applications 18 to be opened according to previous settings determined by the user or a business unit administrator. Applications 18 may be configured in a particular layout within container 40. The settings of container 40 may be based on the user's role, the user's entitlements, the user's business unit, or any other suitable criteria for which to create the configuration settings. In the process of launching applications 18, container 40 also launches the additional features, such as toolbar 80, navigation menu 82, workspace 84, and application menu 86. The settings information may be cached for use with subsequent launches.

At step 406, desktop module 20 determines the subscriptions associated with the launched applications 18. Applications 18 may subscribe to an event to receive an update in context information. Subscribing to events causes updates to be sent to a plurality of different applications 18 among different business units. Therefore, information integration may occur between various applications 18. Each event subscription is monitored at step 408.

At step 410, desktop module 20 determines whether a change has occurred with an event. If a change has occurred, desktop module 20 updates context information associated with the event subscription at step 412. Each active application 18 that has subscribed to the event will receive the update. Inactive applications 18 may receive event updates upon becoming active. Otherwise, the method proceeds to step 414.

At step 414, it is determined whether a request is received to detach application 18 from container 40. If this request is made, application 18 is removed from the interface of container 40 and floats outside container 40 at step 416. When application 18 floats outside container 40, application 18 is inactive and does not receive updates regarding event subscriptions. In this embodiment, container 40 continues to control application 18, but application 18 is not visible on container 40.

If a request to detach application 18 is not received, the method continues to step 418, where it is determined whether a request to synch application 18 with container 40 is received. If a user requests to synch application 18 with container 40, container 40 synchs up application 18 and container 40 and activates application 18 insider container 40. Upon synching up, application 18 becomes visible on container 40 at step 420. If a user does not request to synch application 18 with container 40, it is determined at step 422 whether a request is received to close container 40. If a user does not close container 40, the method continues from step 408 where desktop module 20 continues to monitor each event subscription. Otherwise, the method ends.

Modifications, additions, or omissions may be made to the flowchart. For example, applications 18 may subscribe to other events from which to receive updates. Additionally, steps in FIG. 4 may be performed in parallel or in any suitable order.

Figure 5:
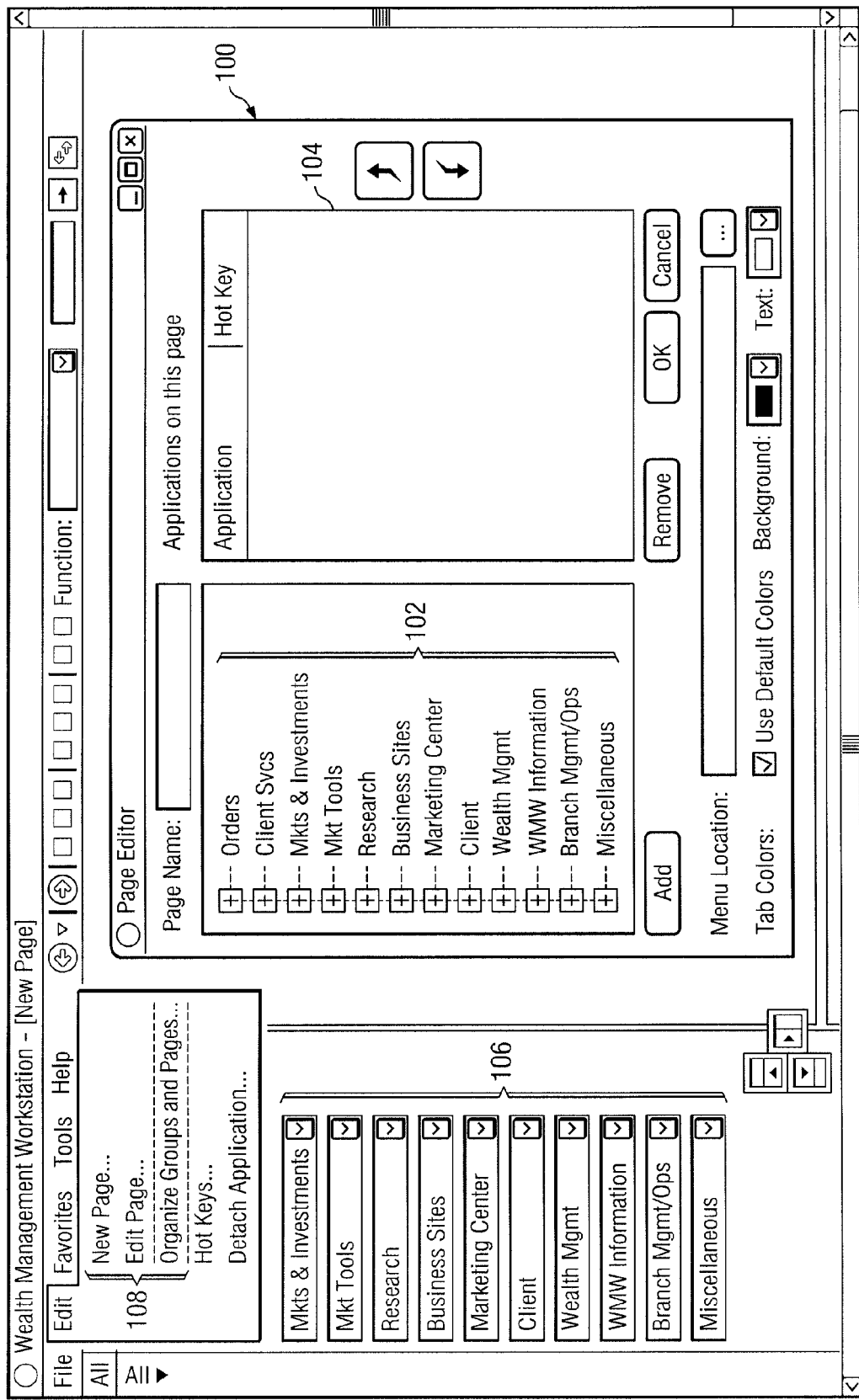
FIG. 5 illustrates an example embodiment of a page editor that facilitates customization using the desktop module.

FIG. 5 illustrates an example embodiment of a page editor 100 that facilitates customization using desktop module 20. For example, memory 28 of desktop module 20 may include logic to facilitate the use of page editor 100. Configuration information produced because of the customization may be stored in service module 56 in a configuration file 58, or memory 28 may store the configuration information in a configuration file. The customization provides the ability to configure features and/or entitlements for a particular user or business unit. Page editor 100 also facilitates the customization of branding style attributes, such as color, font, and/or logo. Using page editor 100, the particular configuration may be turned on or off without having to initiate a full release cycle, and the XML code may be manipulated using page editor 100. Additionally, the meta data of application 18 may be imported into various framework infrastructure systems, such as security, site management, or Universal Description Discovery and Integration. Therefore, container 40 and applications 18 may be generated, developed, customized or deployed without direct involvement from information technology in enterprise 12.

Because specific items are not hard coded into container 40 and may be modified, page editor 100 allows a user to edit the information shown in container 40 and application 18. For example, the user may customize the toolbars and tools 106 that appear in container 40. Tools 106 may be customized using toolbar editor 102. As another example, using application editor 104, a user may customize which applications 18 appear in container 40 and/or the number of applications 18 that appear in container 40. An administrator of a business unit or a user of a particular computer 14 may customize container 40. According to the illustrated embodiment, an administer in the wealth management business unit customizes container 40 as it will appear on a computer 14 within the wealth management business unit.

With page editor 100, a user configures tools 106 that appear within container 40 using tool editor 102. The sidebar on container 40 includes tools 106. A user may utilize tools 106 when working in application 18. Tool editor 102 allows a user to add or remove tools 106 from the sidebar, and allows a user to add or remove sub-tools under each main category of tools 106. The sub-tools may also appear in the sidebar as a drop-down list. In the illustrated embodiment, tool editor 102 is updated to include Orders, Client Services, Markets & Investments, Market Tools, Research, Business Sites, Marketing Center, Client, Wealth Management, WMW Information, Branch Management/operations, and Miscellaneous in the sidebar and is shown as tools 106.

Application editor 104 allows a user to configure applications 18 that appear in container 104. A user may customize the type of applications 18 that appear in container 40 using application editor 104, and may customize the layout of applications 18 using application editor 104. Page editor 100 may also include additional buttons and options that allow a user to customize the format of application 18 by changing the background color, the text color, or default colors. The format customization may also apply to container 40, generally.

Commands 108 represent the instructions to facilitate the process of opening page editor 100, editing a previously existing page, organizing pages, and/or interacting with page editor 100 and container 40. In the illustrated embodiment, commands 108 include New Page, Edit Page, and Organize Groups and Pages.

In an illustrated embodiment of operation, a user launches page editor 100 to customize applications 18 and/or container 40. When page editor 100 is launched, a user interacts with tool editor 102 to customize tools 106 on container 40. The user may also interact with application editor 104 to customize how applications appear in container 40. Upon customizing the information in container 40, the information is stored and applied to container 40 in subsequent launches. The user may terminate page editor 100 upon completion of the customization.

Modifications, additions, or omissions may be made to page editor 100. For example, page editor 100 may allow an administrator to manage a global list of entitlements associated with users in a particular business unit. A particular page editor 100 may support various business units and customize features with each business unit. As another example, page editor 100 facilitates monitoring and auditing activities associated with a business unit. Users' permissions may also be managed.

FIG. 6 illustrates an example execution file to facilitate customization using desktop module 20. The style and format of each application 18 displayed on container 40 may be customized according to a user's preference or according to a business unit's preference. Upon customizing application 18, an execution file may be generated in XML to facilitate presentation of the customized application 18 in container 40.

In the illustrated embodiment, container 40 is edited to include a wealth management application 18, which is indicated in the example XML code. The style in which to display application 18 is further defined in the code. Additionally, the code includes additional features associated with application 18. For example, the illustrated wealth management application 18 includes "Portfolio Inquiries" and "Multi-Currency Performance" as menu items of application 18. Other styles and formats may exist for applications 18 and may be defined in other files accordingly.

Figure 7:
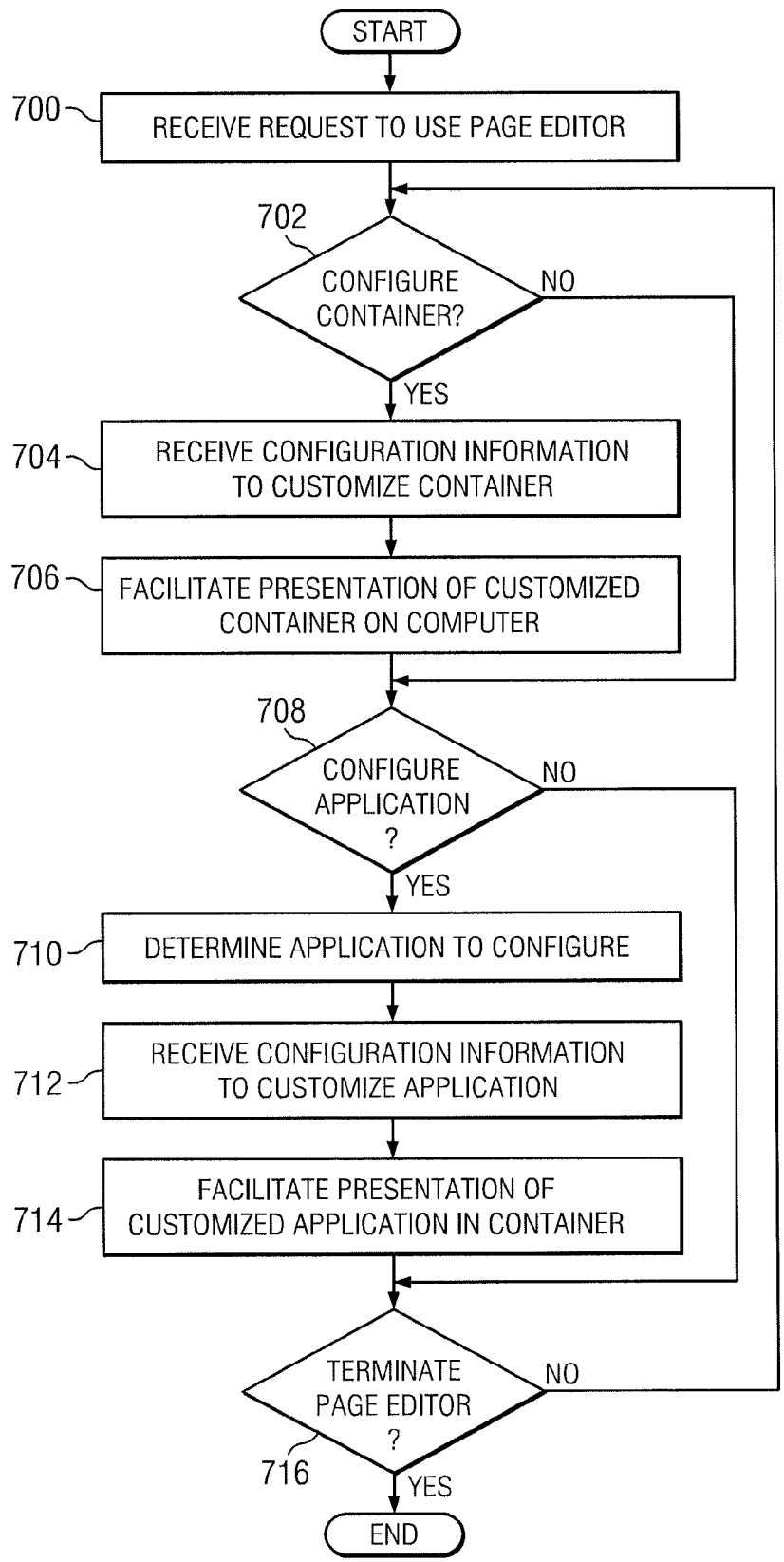
FIG. 7 illustrates a flowchart for customization using the desktop module.

FIG. 7 illustrates a flowchart for customization using desktop module 20. The method begins at step 700 when desktop module 20 receives a request to use page editor 100. A user may open page editor 100 through an icon on GUI 16 of computer 14. When page editor 100 is launched, the user may configure container 40 and/or applications 18.

At step 702, it is determined whether to configure container 40. A user may submit a command to initiate configuration of container 40. If a user desires to configure container 40, desktop module 20 receives configuration information to customize container 40 at step 704. For example, the configuration information may include which tools 106 to present, which options to include in a navigation menu 82, or the format of container 40. Additionally, desktop module 20 may create a modifiable configuration file according to the configuration information. The modifiable configuration file may include instructions to present the information on computer 14 associated with the business unit. At step 706, desktop module 20 facilitates the presentation of the customized container 40 on computer 14. To facilitate the presentation, desktop module 20 may access the modifiable configuration file to facilitate presentation of the information according to the received configuration information. If a user does not desire to configure container 40, the method proceeds to step 708.

At step 708, it is determined whether to configure application 18. A user may submit a command to initiate configuration of application 18. If a user desires to configure application 18, desktop module 20 determines which application 18 to configure at step 710. A user may select application 18 to configure, and the selection is communicated to desktop module 20. A user may proceed to customize application 18. At step 712, configuration information to customize application 18 is received. Additionally, desktop module 20 may create a modifiable configuration file according to the configuration information. The modifiable configuration file may include instructions to present the information on computer 14 associated with the business unit. The modifiable configuration file may include the configuration information to customize container 40 and/or application 18. At step 714, desktop module 20 facilitates presentation of the customized application 18 in container 40. To facilitate the presentation, desktop module 20 may access the modifiable configuration file to facilitate presentation of the information according to the received configuration information. If a user does not desire to configure application 18, the method proceeds to step 716.

At step 716, it is determined whether to terminate page editor 100. If a user does not terminate page editor 100, the method continues from step 702 where desktop module 20 determines whether container 40 may be configured. Otherwise, the customization method ends when page editor 100 terminates.

Modifications, additions, or omissions may be made to the flowchart. For example, a plurality of applications 18 may be configured and customized using page editor 100. As another example, the configuration information for container 40 and/or applications 18 may be stored in configuration files 58 in desktop module 20. Additionally, steps in FIG. 7 may be performed in parallel or in any suitable order.

Figure 8:
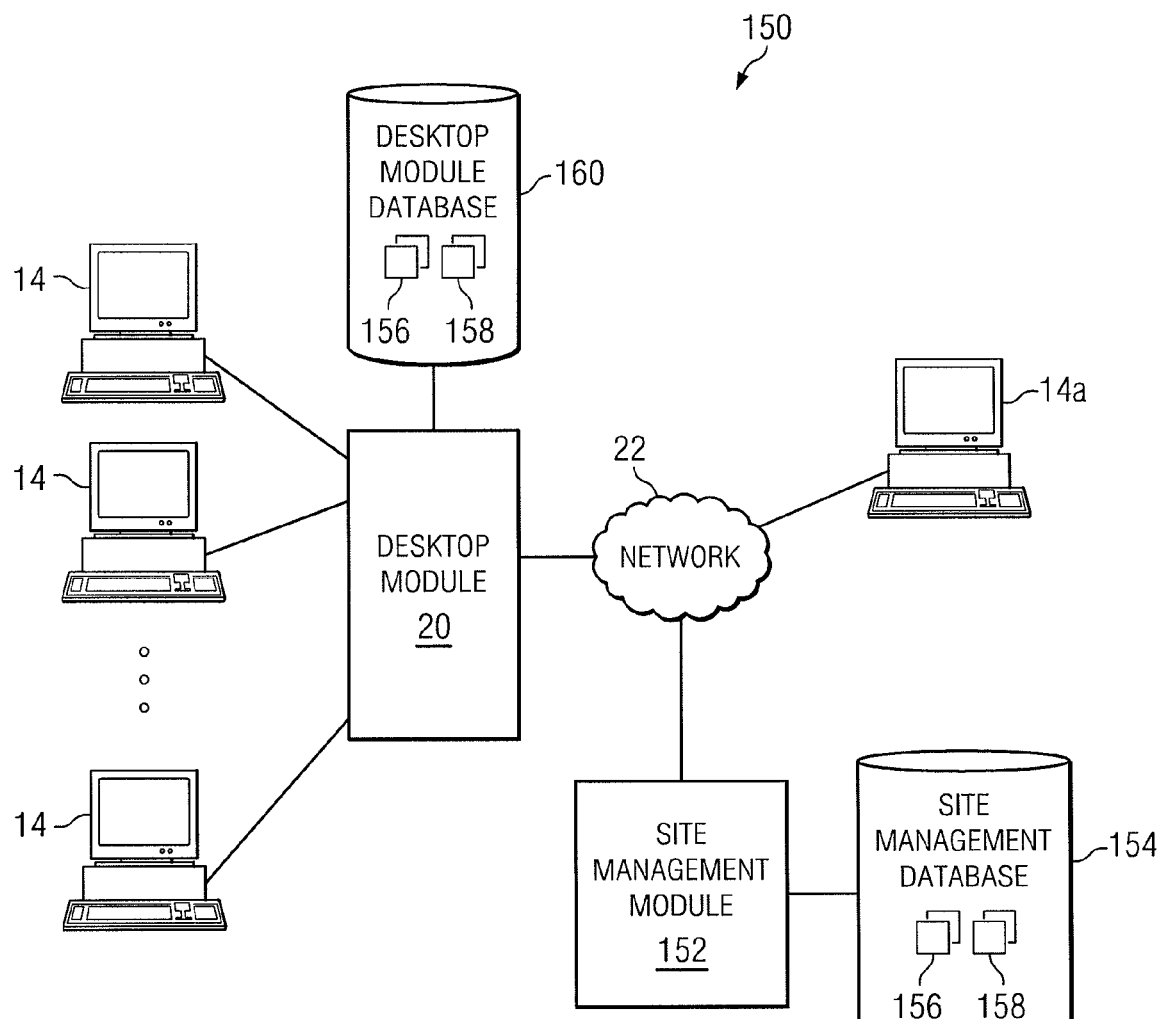
FIG. 8 illustrates an example system that facilitates online customization of information using a site management module.

FIG. 8 illustrates an example system 150 that facilitates online customization of information using a site management module 152. The illustrated embodiment of system 150 comprises computers 14, desktop module 20, and site management module 152 that communicate using network 22.

Site management module 152 represents any component or device that allows a user or administrator of a business unit to customize container 40 and/or application 18 over network 22. The customized container 40 and/or application 18 may provide services to computers 14 that belong to different business units through a shared module. Site management module 152 provides a centralized point of management for the customization of container 40 and/or applications 18. Using site management module 152, a user is able to manage features and formats.

Site management module 152 may include a network server, any suitable remote server, a mainframe, a host computer, a workstation, a web server, a personal computer, a file server, or any other suitable device operable to communicate with computers 14 and desktop module 20 and process data. In some embodiments, site management module 152 may execute any suitable operating system such as IBM's zSeries/Operating System (z/OS), MS-DOS, PC-DOS, MAC-OS, WINDOWS, a .NET environment, UNIX, OpenVMS, or any other appropriate operating system, including future operating systems. The functions of site management module 152 may be performed by any suitable combination of one or more servers or other components at one or more locations. In the embodiment where the module is a server, the server may be a private server, and the server may be a virtual or physical server. For example, site management module 152 may be remote to enterprise 12. Also, site management module 152 may include any suitable component that functions as a server.

Site management database 154 stores, either permanently or temporarily, data, operational software, or other information. In the illustrated embodiment, site management database 154 comprises container settings 156 and entitlement settings 158. Container settings 156 represent the settings of each container 40 associated with each business unit. These settings may include which applications 18 appear on container 40 and the format of container 40. Entitlement settings 158 represent settings that allow a user to access particular information in a business unit, or to view particular information through container 40. Container settings 156 and entitlement settings 158 may represent XML files that are used to customize the experience for a user. Each business unit may associate with particular container settings 156 and entitlement settings 158.

A component of site management module 152 may include an interface, logic, memory, and/or other suitable element. An interface receives input, sends output, processes the input and/or output, and/or performs other suitable operation. An interface may comprise hardware and/or software. Logic performs the operation of the component, for example, logic executes instructions to generate output from input. Logic may include hardware, software, and/or other logic. Logic may be encoded in one or more tangible media, such as a computer readable medium or any other suitable tangible medium, and may perform operations when executed by a computer. Certain logic, such as a processor, may manage the operation of site management module 152. Examples of a processor include one or more computers, one or more microprocessors, one or more applications, and/or other logic.

Site management database 154 includes any one or a combination of volatile or non-volatile local or remote devices suitable for storing information. For example, site management database 154 may include random access memory (RAM), read only memory (ROM), magnetic storage devices, optical storage devices, or any other suitable information storage device or a combination of these devices. While illustrated as including particular modules, site management database 154 may include any suitable information for use in the operation of site management module 152. For example, site management database 154 may include other settings that indicate other types of variables that a user may customize for a particular business unit. Additionally, site management database 154 may be included within site management module 152, rather than being a component external to site management module 152.

Desktop module database 160 stores, either permanently or temporarily, data, operational software, or other information. In the illustrated embodiment, desktop module database 160 comprises container settings 156 and entitlement settings 158. In an embodiment, desktop module database 160 receives container settings 156 and entitlement settings 158 when site management module 152 deploys the user's customizations.

Desktop module database 160 includes any one or a combination of volatile or non-volatile local or remote devices suitable for storing information. For example, desktop module database 160 may include random access memory (RAM), read only memory (ROM), magnetic storage devices, optical storage devices, or any other suitable information storage device or a combination of these devices. While illustrated as including particular modules, desktop module database 160 may include any suitable information for use in the operation of desktop module 20. For example, desktop module database 160 may include other settings that indicate other types of variables that a user may customize for a particular business unit.

In an exemplary embodiment of operation, a user of computer 14a communicates with site management module 152 over network 22 to customize container 40 and/or applications 18 that are associated with a business unit. The remote communication allows the user to customize containers 40 and/or applications 18 without having direct interaction with desktop module 20, which facilitates the provision of containers 40 and applications 18 across various business units. Site management module 152 facilitates provision of a user interface on computer 14a that allows a user to customize container 40 and/or applications 18 through a user-friendly tool. As a user interacts with the user interface to customize the components, an XML file is created that details the user's customization. The XML file may be stored as container settings 156 or entitlement settings 158, depending on the nature of the customization. Site management module 152 then communicates the information over network 22 to desktop module 20. In an embodiment, container settings 156 and entitlement settings 158 may be approved by an administrator before communication to desktop module 20.

Desktop module 20 may store container settings 156 and entitlement settings 158 in desktop module database 160. Therefore, when a user interacts with computer 14, containers settings 156 and entitlement settings 158 may be applied to container 40.

Modifications, additions, or omissions may be made to system 150 without departing from the scope of the invention. For example, computer 14a may internally include the functionality of site management module 152. Additionally, system 10 may include any number of components, and any suitable logic may perform the functions of system 150 and the functions of components within system 150.

Figure 9:
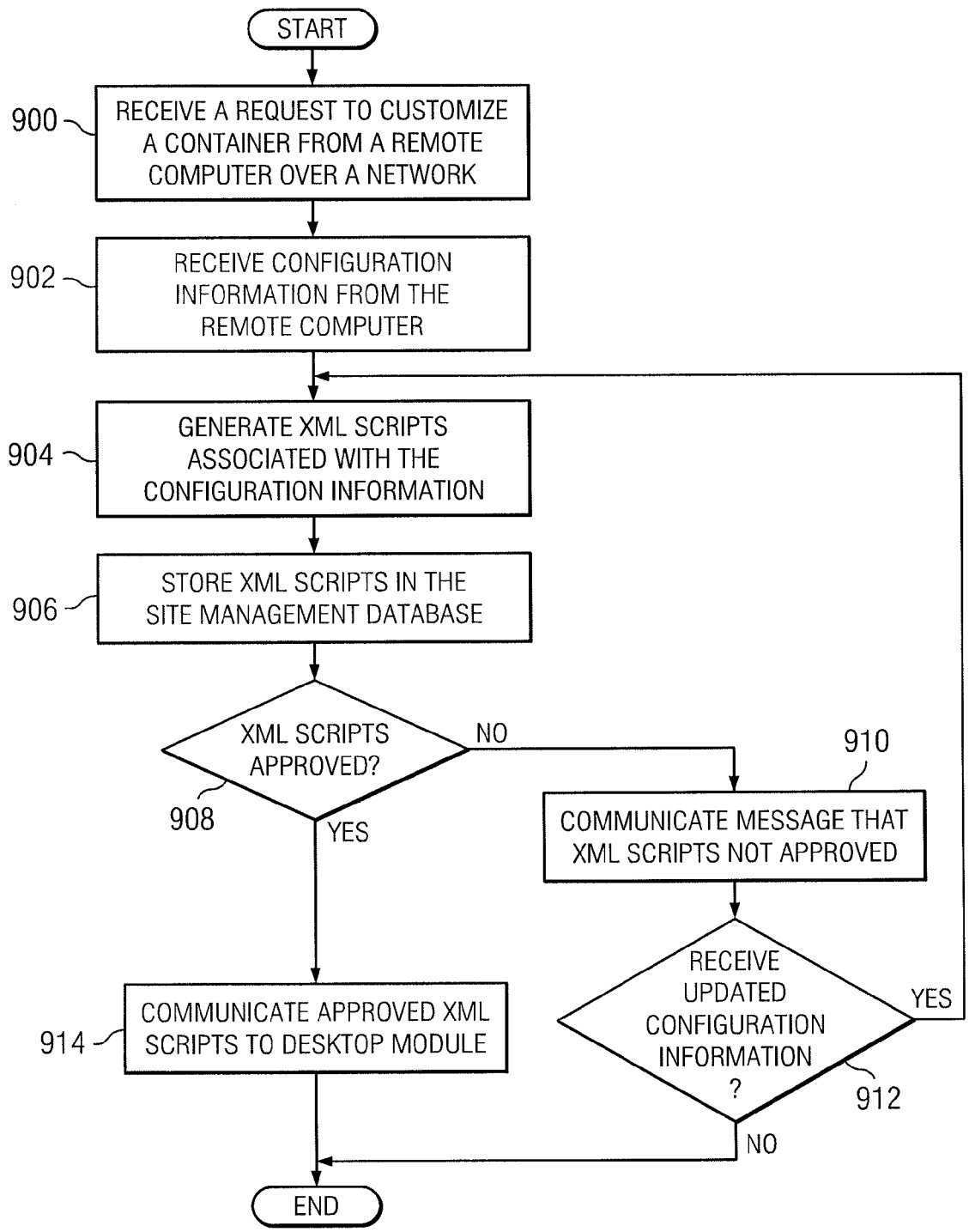
FIG. 9 illustrates a flowchart for online customization of information using the site management module.

FIG. 9 illustrates a flowchart for online customization of information using site management module 152. At step 900, site management module 152 receives a request to customize container 40 from remote computer 14a over network 22. Site management module 152 may facilitate provision of a user interface on computer 14a for a user to submit configuration information. At step 902, site management module 152 receives configuration information from remote computer 14a. Based on the configuration information, site management module 152 generates XML scripts at step 904. At step 906, the XML scripts are stored in site management database 154.

At step 908, site management module 152 determines whether the XML scripts are approved. The XML scripts may be approved if the configuration is permitted for a particular business unit. For example, business unit A may not have access to application 18a. If an XML script is generated that provides business unit A with access to application 18a, the XML script may not be approved.

If the script is not approved, site management module 152, at step 910, may communicate a message to remote computer 14a that the XML scripts are not approved. Site management module 152 may then determine whether updated configuration information is received at step 912. If updated configuration information is received, the method proceeds from step 904 where site management module 152 generates XML scripts associated with the updated configuration information. If updated configuration is not received, the method may end.

If site management module 152 approves the generated XML scripts, the method proceeds to step 914 and site management module 152 communicates the approved XML scripts to desktop module 20. Desktop module 20 may store the scripts in an associated desktop module database 160 for future use. The method may subsequently end upon communicating the scripts to desktop module 20.

Modifications, additions, or omissions may be made to the flowchart. For example, a similar method may apply to customization of application 18 from a remote computer 14. As another example, desktop module 20 may follow a similar method to customize containers 40 and applications 18 locally. Additionally, steps in FIG. 9 may be performed in parallel or in any suitable order.

Certain embodiments of the invention may provide one or more technical advantages. A technical advantage of one embodiment includes providing a common interface between applications and the platform. By providing this common interface, standard patterns of application development may be provided, which reduces costs and improves efficiency. The common interface also provides an intuitive way to manage application windows and application content for multiple types of business applications. Accordingly, a user may navigate and control a number of applications simultaneously. Another technical advantage of an embodiment includes improving technology integration across various business applications and enabling the consolidation and convergence of various platforms. As mentioned above, this consolidation improves development operations by reducing costs and increasing efficiency. Yet another technical advantage of an embodiment includes supporting communication between applications. Applications share information on the desktop rather than involving a server, which improves performance and decreases the load on the server and the network. Another technical advantage of an embodiment comprises providing a single, consolidated deployment infrastructure for various platforms. Applications to be deployed may be customized before deployment or after deployment. The customization may be reflected on a plurality of computers that use the customized application. A user may also perform the customize remotely through the use of a online tool.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for online customization using a site management module, comprising:
   receiving a request, from a remote computer over a network, to modify information for presentation in a container on a computer, wherein the container facilitates interaction and communication between a plurality of applications associated with a plurality of business units;
   receiving configuration information associated with a business unit from the remote computer to modify the presentation of the container and an application;
   generating XML scripts based on the received configuration information;
   determining, by a processor, whether the XML scripts are approved for the business unit, wherein the XML scripts are approved if the business unit has access to the container and the application;
   if the XML scripts are approved, generating, by the processor, a modifiable configuration file according to the XML scripts, wherein the modifiable configuration file comprises instructions to present the information in the container on the computer; and
   if the XML scripts are denied:
   communicating a message to the remote computer that the configuration information is denied; and
   receiving updated configuration information.

2. The method of claim 1, further comprising:
   storing the modifiable configuration file in a database;
   accessing, by the processor, the modifiable configuration file to facilitate presentation of the information according to the received configuration information.

3. The method of claim 1, wherein the modifiable configuration file comprises eXtensible Markup Language (XML) code, and further comprising manipulating the XML code to modify the information for presentation on the computer.

4. The method of claim 1, wherein receiving configuration information to modify the presentation of information comprises receiving configuration information to modify the container presented on the computer.

5. The method of claim 1, wherein receiving configuration information to modify the presentation of information comprises receiving configuration information to modify an application detached from the container.

6. The method of claim 1, further comprising receiving configuration information associated with a plurality of users in the business unit, wherein the modifiable configuration file comprises the entitlements associated with the plurality of users.

7. The method of claim 1, further comprising communicating the modifiable configuration file to a desktop module.

8. A non-transitory computer readable medium comprising logic for online customization using a site management module, the logic, when executed by a processor:
   receiving a request, from a remote computer over a network, to modify information for presentation in a container on a computer, wherein the container facilitates interaction and communication between a plurality of applications associated with a plurality of business units;

receiving configuration information associated with a business unit from the remote computer to modify the presentation of the container and an application;

generating XML scripts based on the received configuration information;

determining whether the XML scripts are approved for the business unit, wherein the XML scripts are approved if the business unit has access to the container and the application;

if the XML scripts are approved, generating a modifiable configuration file according to the XML scripts, wherein the modifiable configuration file comprises instructions to present the information in the container on the computer; and if the XML scripts are denied:
communicating a message to the remote computer that the configuration information is denied; and
receiving updated configuration information.

9. The medium of claim 8, the logic further:
storing the modifiable configuration file in a database; and
accessing the modifiable configuration file to facilitate presentation of the information according to the received configuration information.

10. The medium of claim 8, wherein the modifiable configuration file comprises eXtensible Markup Language (XML) code, and the logic further manipulating the XML code to modify the information for presentation on the computer.

11. The medium of claim 8, wherein receiving configuration information to modify the presentation of information comprises receiving configuration information to modify the container presented on the computer.

12. The medium of claim 8, wherein receiving configuration information to modify the presentation of information comprises receiving configuration information to modify an application detached from the container.

13. The medium of claim 8, the logic further receiving configuration information associated with a plurality of users in the business unit, wherein the modifiable configuration file comprises the entitlements associated with the plurality of users.

14. The medium of claim 8, the logic further communicating the modifiable configuration file to a desktop module.

15. A site management module for online customization, comprising:
an interface that:
receives a request, from a remote computer over a network, to modify information for presentation in a container on a computer, wherein the container facilitates interaction and communication between a plurality of applications associated with a plurality of business units; and
receives configuration information associated with a business unit from the remote computer to modify the presentation of the container and an application; and
a processor that:
generates XML scripts based on the received configuration information;
determines whether the XML scripts are approved for the business unit, wherein the XML scripts are approved if the business unit has access to the container and the application;
if the XML scripts are approved, generates a modifiable configuration file according to the XML scripts, wherein the modifiable configuration file comprises instructions to present the information in the container on the computer; and
if the XML scripts are denied:
communicates a message to the remote computer that the configuration information is denied; and
receives updated configuration information.

16. The module of claim 15, further comprising a memory that stores the modifiable configuration file, wherein the processor further accesses the modifiable configuration file to facilitate presentation of the information according to the received configuration information.

17. The module of claim 15, wherein the modifiable configuration file comprises eXtensible Markup Language (XML) code and the processor further manipulates the XML code to modify the information for presentation on the computer.

18. The module of claim 15, wherein the interface further receives configuration information to modify the container presented on the computer.

19. The module of claim 15, wherein the interface further receives configuration information to modify an application detached from the container.

20. The module of claim 15, wherein the interface further receives configuration information associated with a plurality of users in the business unit and the modifiable configuration file comprises the entitlements associated with the plurality of users.

* * * * *